(12) United States Patent
Choi et al.

(10) Patent No.: US 9,917,893 B2
(45) Date of Patent: Mar. 13, 2018

(54) METHOD AND SYSTEM FOR SUPPORTING DYNAMIC INSTANCE HOSTING SERVICE OF VIRTUAL OBJECT

(71) Applicant: Korea Advanced Institute of Science and Technology, Daejeon (KR)

(72) Inventors: Jun Kyun Choi, Daejeon (KR); Jin Hong Yang, Daejeon (KR); Yong Rok Kim, Daejeon (KR); Hyo Jin Park, Daejeon (KR); Kyu Yeong Jeon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 209 days.

(21) Appl. No.: 14/604,490

(22) Filed: Jan. 23, 2015

(65) Prior Publication Data
US 2016/0105501 A1    Apr. 14, 2016

(30) Foreign Application Priority Data
Oct. 8, 2014    (KR) ........................ 10-2014-0135840

(51) Int. Cl.
*H04L 29/06*    (2006.01)
*H04L 29/08*    (2006.01)
*H04W 4/00*    (2018.01)

(52) U.S. Cl.
CPC .......... *H04L 67/1061* (2013.01); *H04L 63/08* (2013.01); *H04L 67/02* (2013.01); *H04W 4/005* (2013.01)

(58) Field of Classification Search
CPC ..... H04L 67/1061; H04L 67/02; H04L 63/08; H04W 4/05

USPC ................................. 709/225, 226
See application file for complete search history.

(56) References Cited

U.S. PATENT DOCUMENTS

| | | | |
|---|---|---|---|
| 2003/0182427 A1* | 9/2003 | Halpern ................ | G06F 9/4843 709/226 |
| 2011/0068922 A1* | 3/2011 | Ross ..................... | G06Q 10/087 340/572.1 |
| 2013/0204921 A1* | 8/2013 | Diaz .................... | G06F 11/2025 709/202 |
| 2015/0019710 A1* | 1/2015 | Shaashua ............... | H04L 43/10 709/224 |
| 2015/0081904 A1* | 3/2015 | Guedalia ................ | H04L 41/28 709/225 |
| 2015/0249672 A1* | 9/2015 | Burns ..................... | H04L 63/66 726/4 |
| 2016/0119434 A1* | 4/2016 | Dong .................. | H04L 41/5054 709/220 |

* cited by examiner

*Primary Examiner* — Brian Whipple
*Assistant Examiner* — Hannah S Wang
(74) *Attorney, Agent, or Firm* — Marshall, Gerstein & Borun LLP

(57) ABSTRACT

Disclosed is a method and system for re-directing a dynamic instance hosting service of a virtual object. The dynamic instance hosting service re-directing system may include a spatial information controller configured to determine whether an instance of an Internet of Things (IoT) device is movable based on spatial information of the IoT device using an instance hosting function; and an instance resource controller configured to manage available instance resources associated with the IoT device and an external service for an instance movement of the IoT device.

10 Claims, 14 Drawing Sheets

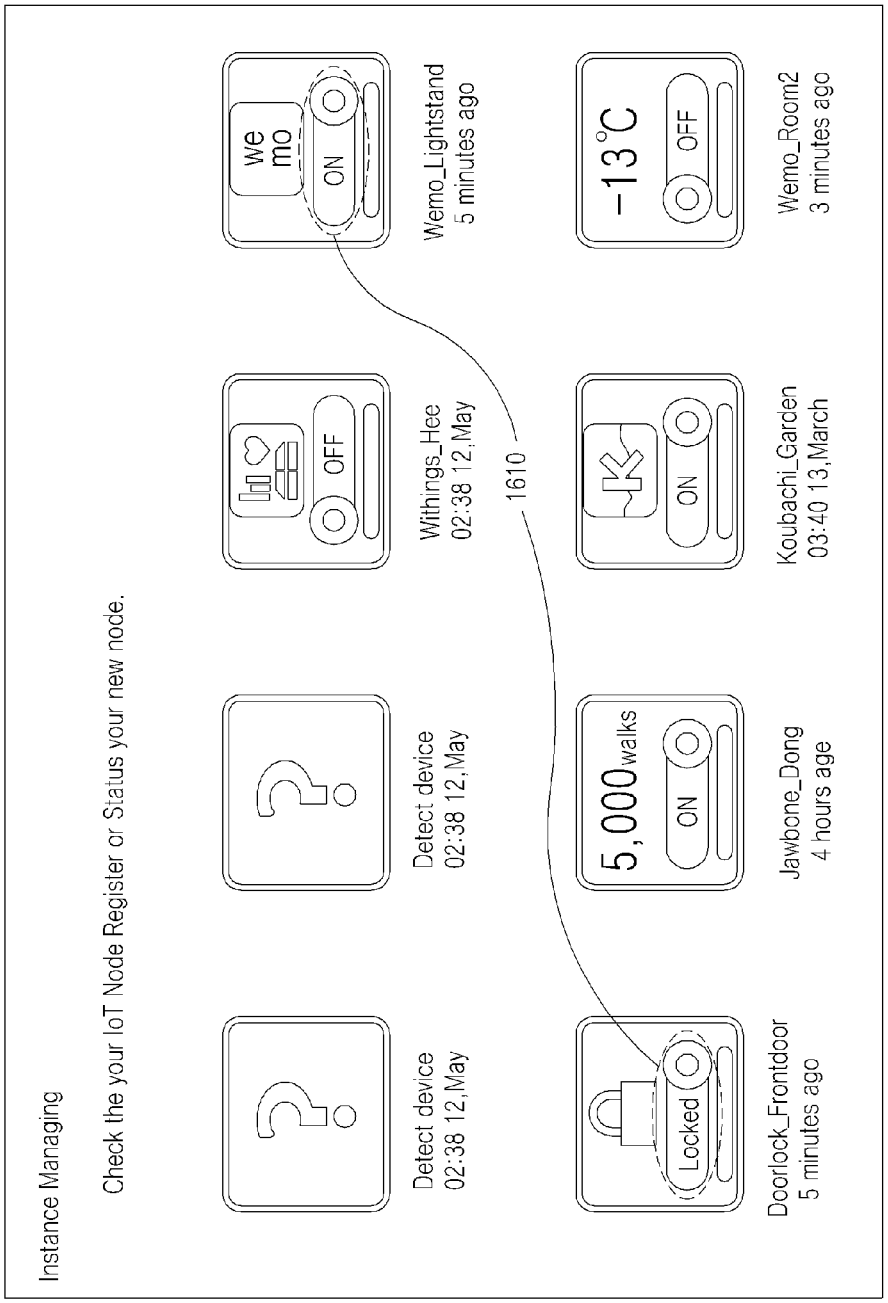

METHOD AND SYSTEM FOR SUPPORTING DYNAMIC INSTANCE HOSTING SERVICE OF VIRTUAL OBJECT

CROSS-REFERENCE TO RELATED APPLICATION

This application claims the priority benefit of Korean Patent Application No. 10-2014-0135840, filed on Oct. 8, 2014, in the Korean Intellectual Property Office, the disclosure of which is incorporated herein by reference.

BACKGROUND

1. Field of the Invention

Embodiments of the present invention relate to a method and system for dynamically re-directing a hosting service environment of a virtual object in response to a movement of an Internet of Things (IoT) device.

2. Description of the Related Art

The Internet of Things (IoT) has been evolved from an existing Ubiquitous Sensor Network (USN) or Machine to Machine (M2M). The primary goal of the existing M2M has been to achieve communication between an end device and a person. In contrast, the goal of the IoT is to expand the scope of things and thereby enables communication between a person and things such as a telephone, a book, and a thermometer, which persons can easily view. That is, the IoT indicates a thing-space connecting network that cooperatively forms an intellectual relationship, such as sensing, networking, and information processing, without an explicit intervention of a person with respect to three distributed environmental elements, i.e., a person, a thing, and a service.

In addition to the IoT, various concepts and technologies, such as Web of Things (WeB) and Web of Objects (WoO), have been studied and also under development. The development and spread of the concepts and the technologies will bring an increase in the use of devices, for example, a gadget device, a sensor device, and an actuator, users can easily connect to the Internet.

In particular, various types of web-interactive gadget devices are recently released. Many sensor devices are providing controlling and monitoring functions through a web. Additionally, terminals to provide a control function through a web are embedded with a web server function or include a function controllable through an online web service.

However, in the current situations, the aforementioned technologies, devices, or services are individually managed, thereby causing user inconveniences. For example, although a plurality of devices is present around a user, the user may need to control each of the devices through an individual access path, for example, a uniform resource locator (URL). When a device itself provides a web access function, for example, a server function, a network interaction and a URL, for example, an Internet protocol (IP) address for an access to an individual device are required. When a service is provided through an exclusive web service, a generation of an access right and a URL are required for each service.

Further, data individually managed may not be readily used through an organic interaction. For example, in the case of a sensor configured to control a boiler inside a house, ambient environment information directly collectable by a sensor device is significantly limited. That is, limited information such as presence/absence of a person indoors, an indoor temperature, and a time zone may be collected. If the sensor device is capable of additionally using outside information, for example, an outdoor temperature and user schedule information, the sensor device may provide a further effective control function. However, since data is individually managed for each technology, each device, or each service, it may be difficult to use such data through an organic interaction between the data.

FIG. 1 illustrates a method of providing a service when a device includes an embedded web server according to the related art. A user may access an embedded web server 140 embedded in a device 130, for example, an IoT node, of a physical world 120 through an online 110, for example, a web. Here, since the embedded web server 140 is included in the device 130, data generated by the device 130 and all of process logics to process a predetermined function or service are included in the device 130. Accordingly, it is impossible to provide a service interacting with or fused with data of another service coverage or another service, beyond a service coverage provided from the device 130.

FIG. 2 illustrates a method of providing a service when a manufacturer provides a separate web server online according to the related art. Dissimilar to FIG. 1, FIG. 2 illustrates a method of providing a service in such a manner that a manufacturer or a separate service provider constructs a web server 210 online 110. Here, a user may access a device 220, for example, an IoT node, through the online web server 210. In this case, a module, for example, a Hypertext Transport Protocol (HTTP) adaptor 230, for communication with the web server 210 may be mounted to the device 220. Accordingly, data generated by the device 220 and all of process logics to process a predetermined function or service may be provided online. Depending on necessity, data may be present in the device 220 and the process logics may be present in the web server 210. In this case, issues, such as the web service availability performance of the manufacturer or the separate service provider and the permanency of hosting, may arise.

Referring to FIGS. 1 and 2, the user may not access the device 130 embedded with the embedded web server 140 through the web server 210, and may not access the web server 210 or the device 220 through the embedded web server 140 of the device 130. That is, exchange of information between object instances is impossible and thus, an interactive or fused service may not be provided.

Additionally, referring to FIG. 2, since the device 220 is to provide, to the web server 210, information obtained from a thing such as a sensor or personal information of a user such as a location of the user in order to provide a service, a privacy issue of the user may occur.

SUMMARY

An aspect of the present invention provides a service providing method and system for managing heterogeneous devices or various services through interaction or fusion therebetween, and providing an integrated service in an Internet of Things (IoT) environment, a Web of Things (WoT) environment, or a Web of Objects (WoO) environment.

According to an aspect of the present invention, there is provided a method of re-directing a dynamic instance hosting service in an instance hosting environment, the method including discovering an IoT device using an instance hosting function, and exchanging movable predetermined instance information in instance information registered with respect to the IoT device with another instance hosting system.

Prior to the exchanging, the dynamic instance hosting service re-directing method may further include verifying a right to interact with the IoT device based on an authentication method using an open application programming interface (API) of a service connected to the IoT device.

The dynamic instance hosting service re-directing method may further include inactivating a corresponding instance when the predetermined instance information is registered to the other instance hosting system.

According to another aspect of the present invention, there is provided a method of re-directing a dynamic instance hosting service in an instance hosting environment, the method including detecting a new IoT device to use an instance hosting function, and requesting the other instance hosting system to which an instance is registered with respect to the new IoT device to suspend an instance operation of the new IoT device, and deploying the instance with respect to the new IoT device.

Prior to the deploying, the dynamic instance hosting service re-directing method may further include discovering a virtual object with respect to the new IoT device, and requesting the other instance hosting system to verify whether the new IoT device has moved, using information associated with the virtual object. The other instance hosting system may be configured to inquire about the instance registered with respect to the new IoT device based on information associated with the virtual object, and to determine that the new IoT device has moved when a call of the registered instance by the new IoT device is absent.

The dynamic instance hosting service re-directing method may further include requesting interface information of the virtual object connected to the other instance hosting system, and connecting a service associated with the instance with respect to the new IoT device, using the interface information.

The interface information may include internal interface information of the instance registered with respect to the new IoT device and external open API connection information, and the connecting may include connecting a direct service to the interface using the internal interface information and connecting an external API to the instance using the external open API connection information.

According to still another aspect, there is provided a system for re-directing a dynamic instance hosting service, the system including a spatial information controller configured to determine whether an instance of an IoT device is movable based on spatial information of the IoT device using an instance hosting function, and an instance resource controller configured to manage available instance resources associated with the IoT device and an external service for an instance movement of the IoT device.

EFFECTS

According to embodiments of the present invention, it is possible to manage heterogeneous devices or various services through interaction or fusion therebetween and to provide an integrated service in an Internet of Things (IoT) environment, a Web of Things (WoT) environment, or a Web of Objects (WoO) environment.

Also, according to embodiments of the present invention, it is possible to provide a mobility to a virtualized IoT device using an instance hosting function, and to provide a permanent service of the virtualized IoT device by maintaining a connection between virtual objects connected in a form of a mash-up or an open application programming interface (API).

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIGS. 15 and 16 illustrate examples of an instance list page according to an embodiment of the present invention.

DETAILED DESCRIPTION

Figure 1:
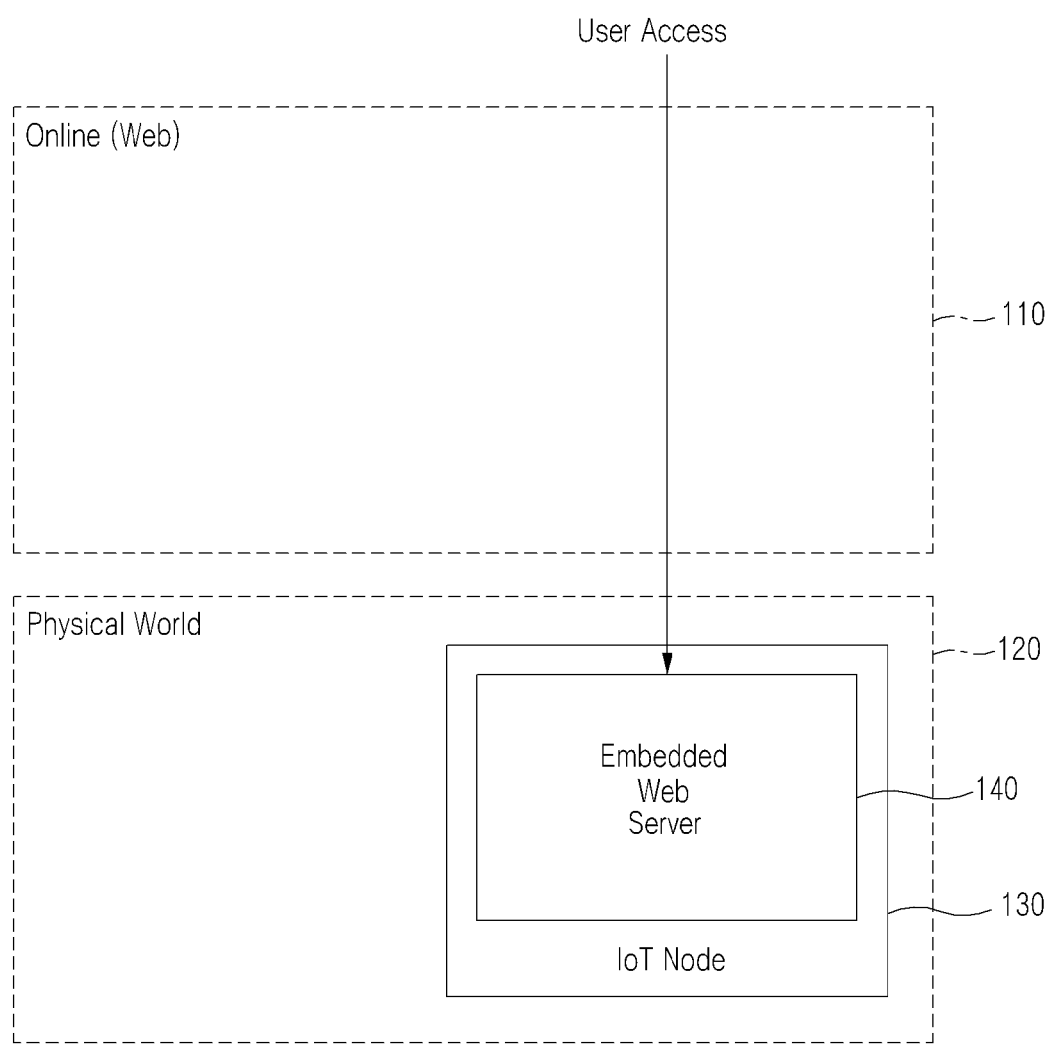
FIG. 1 illustrates a method of providing a service when a device includes an embedded web server according to the related art.
Figure 2:
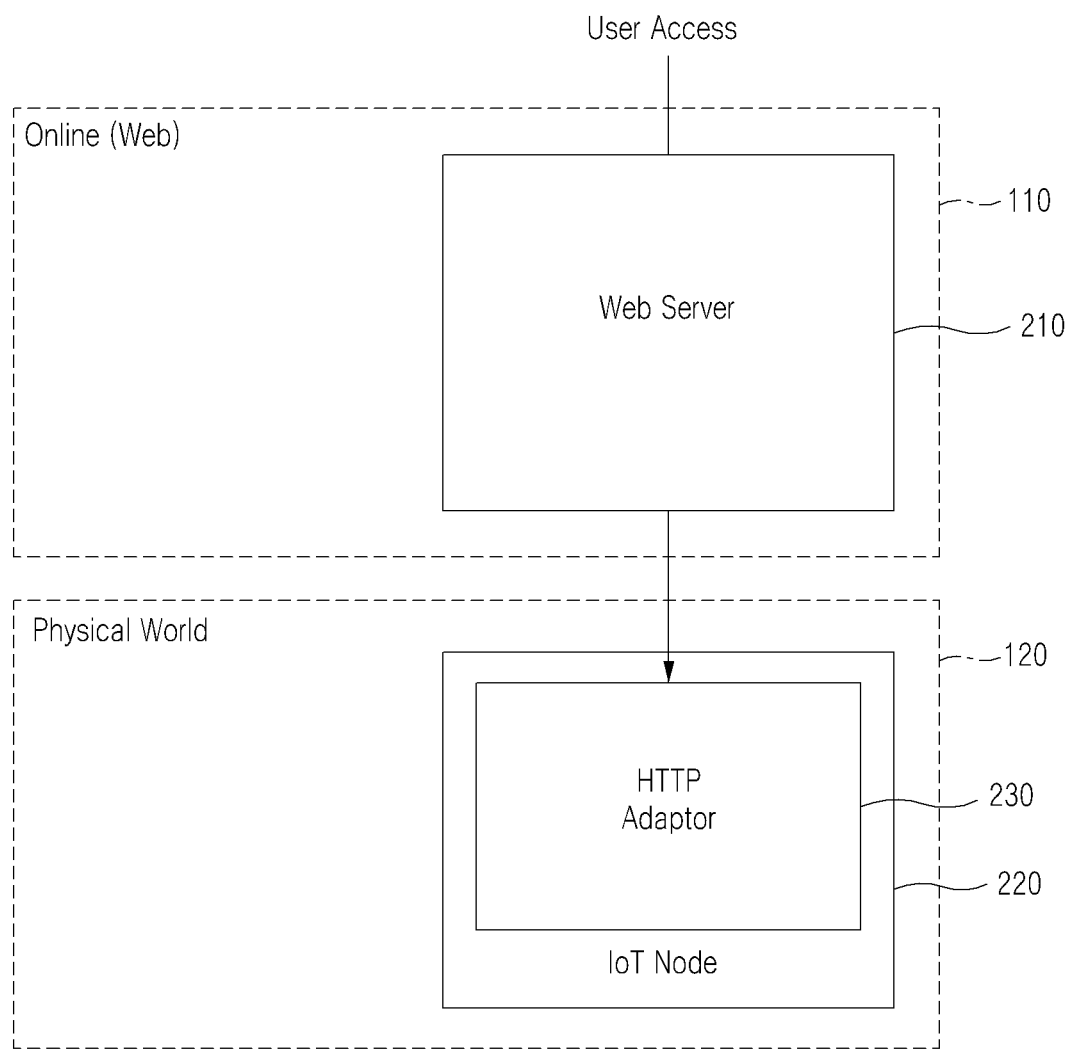
FIG. 2 illustrates a method of providing a service when a manufacturer provides a separate web server online according to the related art.

Reference will now be made in detail to embodiments of the present invention, examples of which are illustrated in the accompanying drawings, wherein like reference numerals refer to like elements throughout. Embodiments are described below to explain the present invention by referring to the figures.

The embodiments relate to a technology for preventing a service interruption through a dynamic movement of a virtual object in response to a movement of a device in an instance hosting environment that provides a service function of a virtualized device.

When a plurality of devices is to be registered and be used in an Internet of Things (IoT) environment, various connections using a mash-up and an application programming interface (API) are expected to be performed between related virtual objects. Accordingly, a technology for dynamically moving a virtual object is required to seamlessly provide related services in response to a movement of a predetermined device.

Initially, an instance hosting environment of the present invention will be described.

Figure 3:
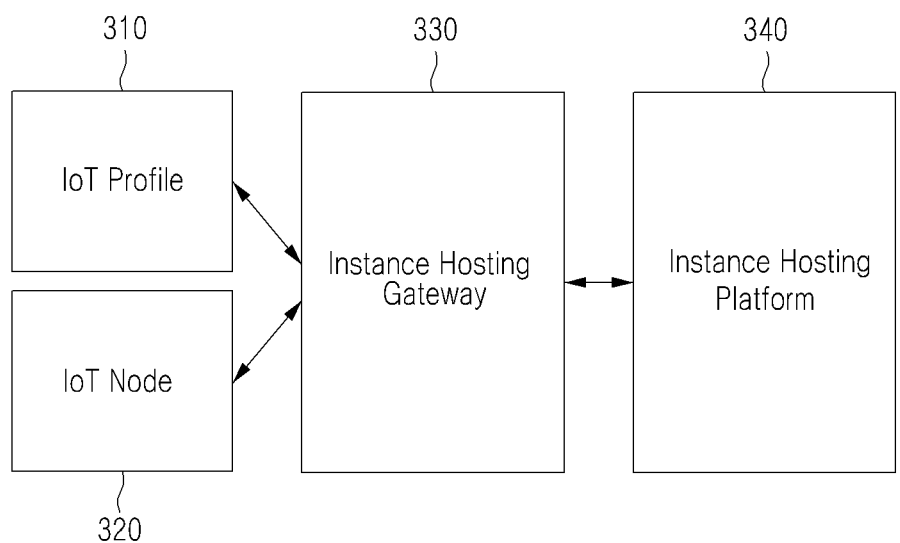
FIG. 3 illustrates an example of the overall system structure for an instance hosting according to an embodiment of the present invention.

FIG. 3 illustrates an example of the overall system structure for an instance hosting according to an embodiment of the present invention. FIG. 3 illustrates an IoT profile 310, an IoT node 320, an instance hosting gateway 330, and an instance hosting platform 340.

The IoT profile 310 may indicate information about the IoT node 320 provided online from a manufacturer or a developer. For example, the IoT profile 310 may indicate an eXtensible Markup Language (XML) file generated when the manufacturer or the developer processes information about the IoT node 302 based on a predetermined XML scheme to minimize the user inconvenience coming from the passive data input to the instance hosting gateway 330.

The IoT profile 310 may include an identifier, for example, a uniform resource locator (URL) of a document including information about a process, of a process in which a description about the IoT node 320 and an operation of the IoT node 320 are disclosed. For example, a process may be provided online using a separate file, for example, an extension '.js' file. The identifier of the process may be a URL indicating a location of the file. The following Table 1 shows an example of information includable in the IoT profile 310.

TABLE 1

| Name | Description | Note |
| --- | --- | --- |
| IoTProfileID | Unique URL at which an IoT profile is located. | Expressed in a form of a URL |
| IoTProfileVer | Version of an IoT profile | Expressed in a form of 'V' + 'number' |
| IoTProfileDesc | Description of an IoT profile | |
| IoTInput | Input value of an IoT node (, which is not required for an instance node not providing an input function), and info for generating RESTful API. | Data support format JSON XML |
| IoTOutput | Output value of an IoT node, and info to generate RESTFUL API | |
| IoTProcessID | Process identifier of an IoT node | Expressed in a form of URI |

The IoT node 320 may correspond to things of an IoT environment, such as a sensor device, and may provide identifier information of the IoT node 320, such as 'IoTNodeID'. When the IoT node 320 is a non-constraint node such as a smart device, the IoT node 320 may also directly provide the IoT profile 310.

Even though a single IoT node 320 and a single IoT profile 310 with respect to the IoT node 320 are illustrated in FIG. 3 for conciseness, it will be understood that a plurality of IoT nodes and IoT profiles with respect to the respective plurality of IoT nodes may be used in the IoT environment. Further, a plurality of IoT profiles may be provided with respect to a single IoT profile.

That is, a relationship between an IoT node and an instance may be variously established based on, for example, 1:1, 1:N, N:1, and N:M. Also, although a physical IoT node is absent, an instance may be present in a form of a process. An instance may be generated and interact through an interaction between processes, instead of interacting with a predetermined device such as a mash-up process. For example, when a predetermined process is deployed and operates in the instance hosting gateway 330 without connecting to a separate IoT node, an instance may be generated at the instance hosting gateway 330. Herein described is an embodiment of connecting an individual instance and a message received from an IoT node (a physical node) described as the overall physical device through communication between the IoT node and an instance hosting gateway according to embodiments of the present invention and thereby processing the message. However, at least one IoT node may be present in a form of not a physical device but a process. For example, at least one node may be present in a form of a process node.

Also, a process of receiving information from a plurality of sensors and providing only an interacting function with another online web service or application without using a physical device such as a sensor device or an actuator may be provided. For example, in the case of a service that provides a predetermined result by analyzing information of sensors and status information of a social service or a predetermined application used by a user, a separate processing environment for operating the corresponding service is required. In this case, the instance hosting gateway according to embodiments of the present invention may provide the processing environment.

The instance hosting gateway 330 may process a message received from the IoT node 320 by connecting the message to an individual instance, and may interact with an external service in response to a request of a user or a service. The instance hosting gateway 330 may be provided in an access point (AP) environment for the IoT node 320. For example, the instance hosting gateway 330 may include an instance application server that is included in an AP to operate in a form of a web application server (WAS), and a portion that is included in the AP in a form of software, hardware, or a combination of software and hardware. For example, the portion may be a module to be included in an operating system (OS) of the AP in a form of software and a module to be included in a form of hardware for communication with the IoT node 320.

As an example, the instance hosting gateway 330 may be included in an AP installed in a predetermined space, for example, inside a house, and may perform a function of receiving and processing data through communication with things, for example, IoT nodes, present in the predetermined space and providing an interaction service with an external service.

In this instance, in response to a discovery of a new IoT node 320, the instance hosting gateway 330 may download and install the IoT profile 310. For example, the user may input a location of an XML file corresponding to the IoT profile 310 to the instance hosting gateway 330 and the instance hosting gateway 330 may download and install the XML file based on the input location.

The instance hosting platform 340 may provide an interacting function between instances and a mash-up function. For example, the instance hosting gateway 330 may provide a function to be provided in response to a request of a user or a service, to an outside in a form of an API, and may communicate with the instance hosting platform 340 to interact with an external service.

As described above, the present invention provides a technology for providing a service in an instantaneous and distributed form by executing a virtualized IoT object in a gateway or an edge network environment in order to provide a further effective and pervasive service with the tendency of using a plurality of smart gateways or an IoT device aggregator.

An instance hosting service according to an embodiment of the present invention may provide a Platform As A Service (PaaS) function for an IoT service and may also provide a function for effectively providing a service to a plurality of IoT devices.

Figure 4:
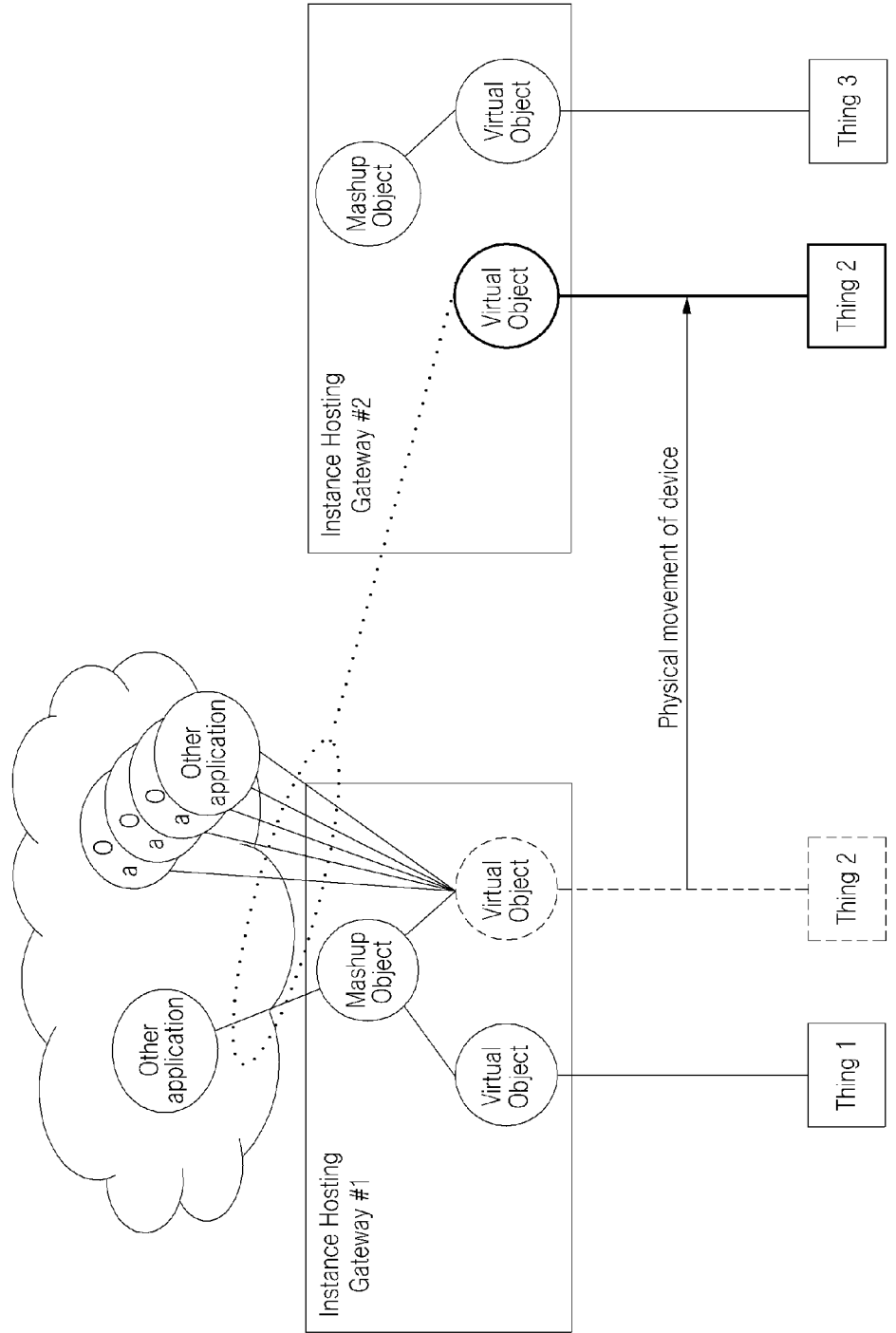
FIG. 4 is a diagram to describe an environment for re-directing a hosting service in response to a physical movement of a device according to an embodiment of the present invention.

In response to a location movement of a real-world object connected to an IoT service or a use of another instance hosting service environment by a request of the user, a hosting service of a virtual object needs to be re-directed to provide the same service. For example, as illustrated in FIG. 4, a hosting service of a virtual object needs to be re-directed in response to a physical movement of a device.

The requirements for re-directing a hosting service of a virtual object follow as:

(1) Deployment of a virtual object in an instance hosting environment of a destination;
(2) Movement of existing hosting instance information;
(3) Update of connection information of a connected mash-up service; and
(4) Update of right in another instance hosting environment.

That is, in the present embodiment, to dynamically re-direct a hosting service environment of a virtual object in response to a movement of an IoT device, a device that serves as a gateway in a distance proximate from the IoT device may provide an instance hosting service to a virtual object of an individual IoT device. The requirements used for the above purpose may include information regarding whether the virtual object of the individual IoT device is to use a dynamic instance hosting environment and whether an instance hosting server in which the virtual object is currently operating provides the corresponding function.

Figure 5:
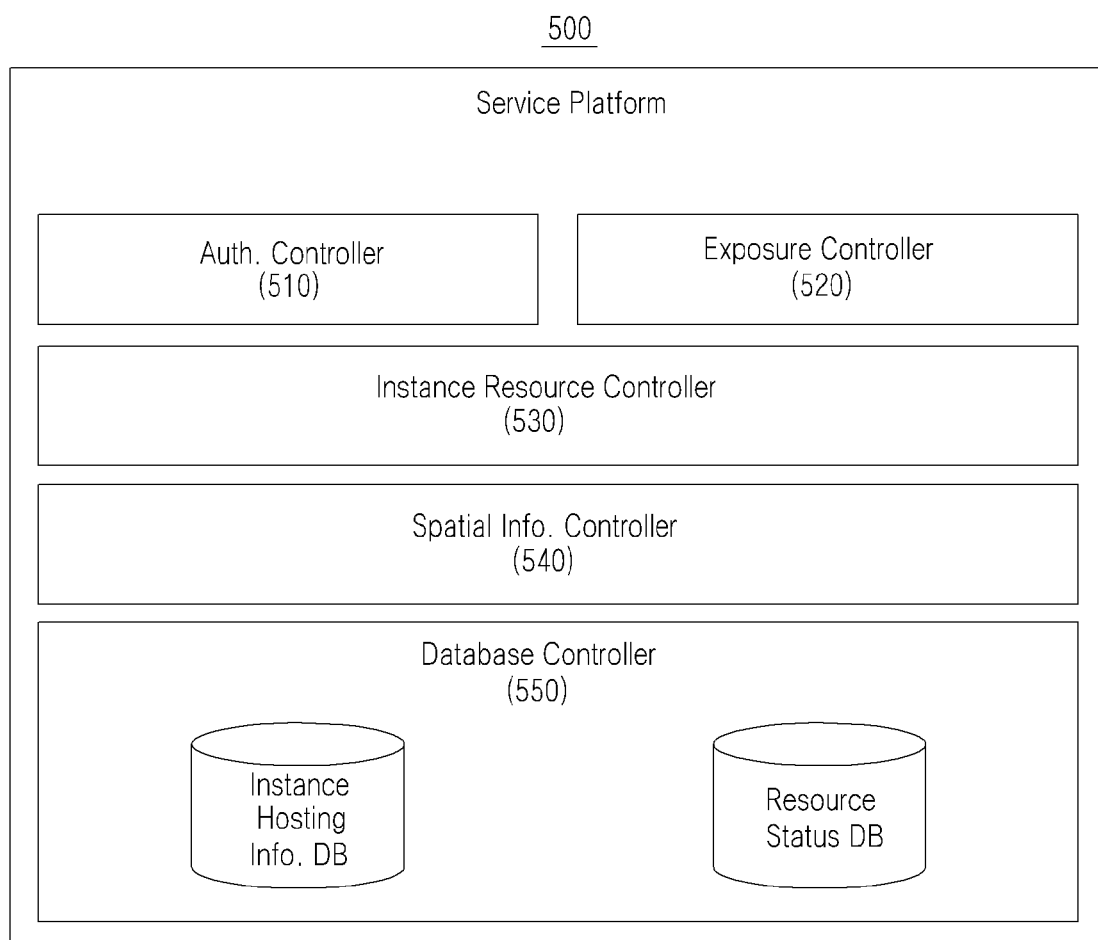
FIG. 5 illustrates a system structure of a service platform for re-directing a hosting service of a virtual object according to an embodiment of the present invention.

FIG. 5 illustrates a system structure of a service platform for re-directing a hosting service of a virtual object according to an embodiment of the present invention.

Referring to FIG. 5, a hosting service re-directing system 500 refers to a service platform for supporting a dynamic instance deployment of a virtual object and may include an authentication controller 510, an exposure controller 520, an instance resource controller 530, a spatial information controller 540, and a database controller 550.

The authentication controller 510 serves to register and authenticate information between instance hosting platforms allowing an instance movement.

The exposure controller 520 serves to use spatial information and a device connected to a device in which an instance hosting between an IoT application of an individual instance hosting platform and 3$^{rd}$ party IoT interaction applications is deployed.

The instance resource controller 530 serves to manage resources of the connected device and instance, and to directly drive a service.

The spatial information controller 540 serves to manage spatial circumstance information in physical, logical, and relative perspectives between instance hosting platforms.

The database controller 550 serves to store and manage individual information used to re-direct the hosting service of the virtual object.

Figure 6:
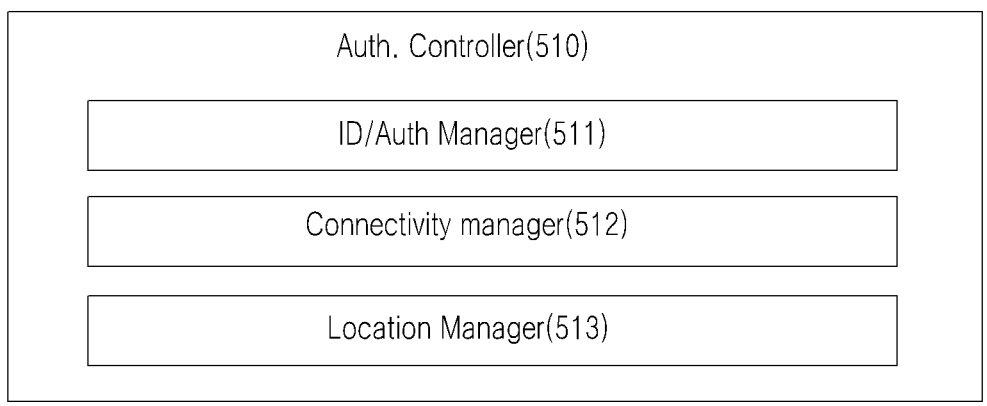
FIG. 6 illustrates an example of an authentication controller according to an embodiment of the present invention.

FIG. 6 illustrates an example of an authentication controller 510 according to an embodiment of the present invention.

The authentication controller 510 provides a function of authenticating a device using an instance hosting function on a wireless router or a gateway and a function of collecting connectivity location information.

Referring to FIG. 6, the authentication controller 510 may include an authentication (ID/Auth) manager 511, a connectivity manager 512, and a location manager 513.

The authentication manager 511 may issue an ID based on unique information, for example, a media access control (MAC), of a corresponding device in response to a connection of an instance hosting device, and may perform authentication processing on the instance hosting device using the corresponding ID.

The connectivity manager 512 may manage a connection with the instance hosting device, and may provide a function of managing a continuous connection status in the case of using a dynamic Internet protocol (IP).

The location manager 513 may manage location information of the instance hosting device based on IP address and user input information. In this instance, when the instance hosting device has 1) a function of controlling a space of a predetermined spatial area and 2) a function of controlling an IoT device, the location manager 513 may provide a function of managing a right to control resources, for example, a predetermined service or user based on a time table, with respect to the corresponding space.

According to the above configuration, the authentication controller 510 may collect data input/output (I/O) related information when registering the instance hosting device. Details of collected information may be expressed as the following Table 2.

TABLE 2

| H/W and S/W info of device | Status info of device |
|---|---|
| MAC Address | Radio interference info (info about peripheral radio signal and SSID is periodically collected) |
| IP Address | |
| Wireless Interface | IoT application (instance profile) deployment info |
| CPU Clock | Application profile |
| Memory | Application title |
| Flash Storage | Tag |
| OS Codename, Version | Feeder info (data type) |
| Instance Manager Version | IoT devices connection info (determined using minimum connection check period based on profile) |
| | IoT devices resource use info (feeder info) |

Figure 7:
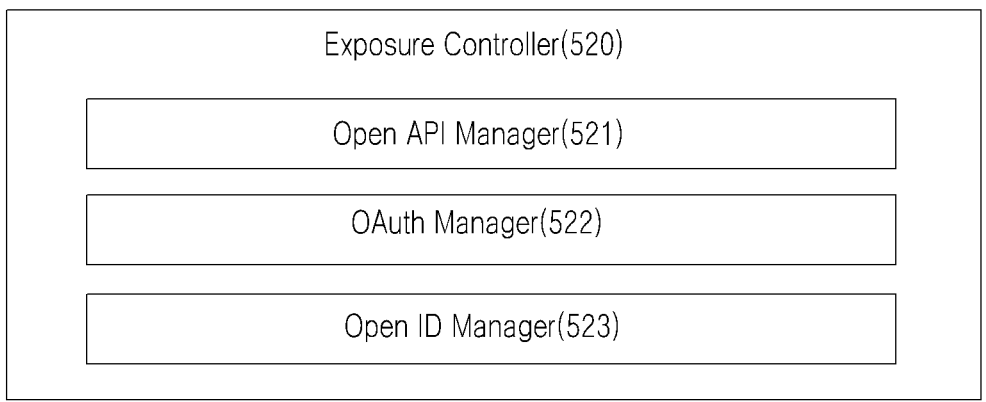
FIG. 7 illustrates an example of an exposure controller according to an embodiment of the present invention.

FIG. 7 illustrates an example of an exposure controller 520 according to an embodiment of the present invention.

The exposure controller 520 may provide an internal/external interaction interface function with respect to a service function provided from an instance hosting platform and an individual instance hosting device.

Referring to FIG. 7, the exposure controller 520 may include an open API manager 521, an authentication (OAuth) manager 522, and an open ID manager 523.

The open API manager 521 may provide a function including authentication and logging of interface information provided in a form of an open API, a data interaction, and the like. In this instance, a virtual object based function connected to an instance hosting device may generate an open API through the instance hosting platform.

In particular, when a second instance hosting device is to connect to an instance having an external interaction interface among instances in a form of a mash-up, the open API manager 521 may provide a function for the connection.

The OAuth manager 522 may provide an authentication function with respect to a user and a service based on a standard authentication (OAuth) method that has been developed using the open API.

The open ID manager 523 may provide an authentication function with respect to a user and a service using an open ID.

An authentication service using the OAuth method and the open ID may use the OAuth method or the open ID for mutual authentication of instance deployment information when moving an instance based on an instance hosting. Also, when using a control service of the instance hosting device, the authentication service may authenticate or directly control a device control service on the instance hosting platform using the OAuth method or the open ID in addition to an accessible method authenticated through the open API.

Figure 8:
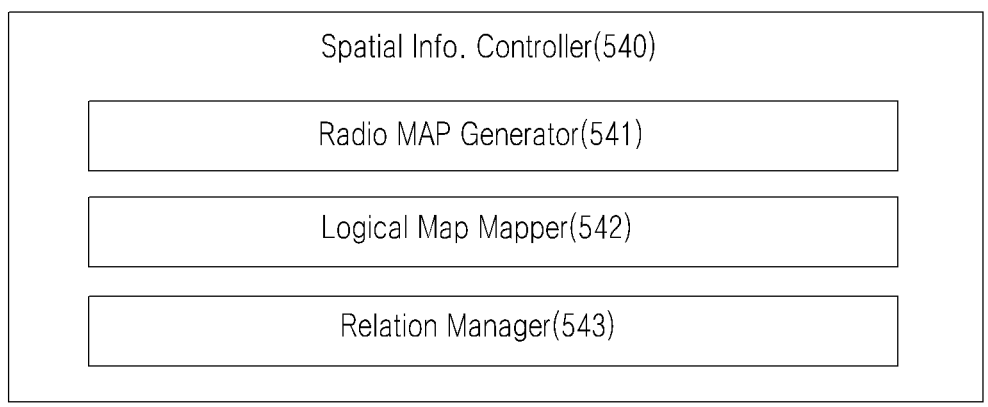
FIG. 8 illustrates an example of a spatial information controller according to an embodiment of the present invention.

FIG. 8 illustrates an example of a spatial information controller 540 according to an embodiment of the present invention.

The spatial information controller 540 may provide a function of generating a map according to logical and physical locations of devices by combining information of a connected instance hosting device, and determining whether instances of proximate devices are movable based on the generated map.

Referring to FIG. 8, the spatial information controller 540 may include a radio map generator 541, a logical map mapper 542, and a relation manager 543.

The radio map generator 541 may configure spatial information in which an instance hosting function is provided in an explicit (user location information registration)/implicit form based on a radio interference signal.

The logical map mapper 542 may provide a function of mapping location information of an instance hosting device to a location (GIS information) of a real-world environment and relative location information within an individual building by combining information capable of identifying a location, such as radio map information, user input information, an IP address, and tag information of devices registered to the instance hosting device.

The relation manager 543 may provide a function of generating a relationship between resources based on information of IoT devices and sensors registered between instance hosting devices. That is, the relation manager 543 may generate a relationship between resources when verifying whether a corresponding service function is available.

The spatial information controller 540 configured as above may use, as an alternative input, information of the same instance hosting device or a device connected to a peripheral instance hosting device by utilizing virtual object information identical or similar to an existing sensor and devices as a dynamic or sensing environment reconfiguration method according to a circumstantial change.

Figure 9:
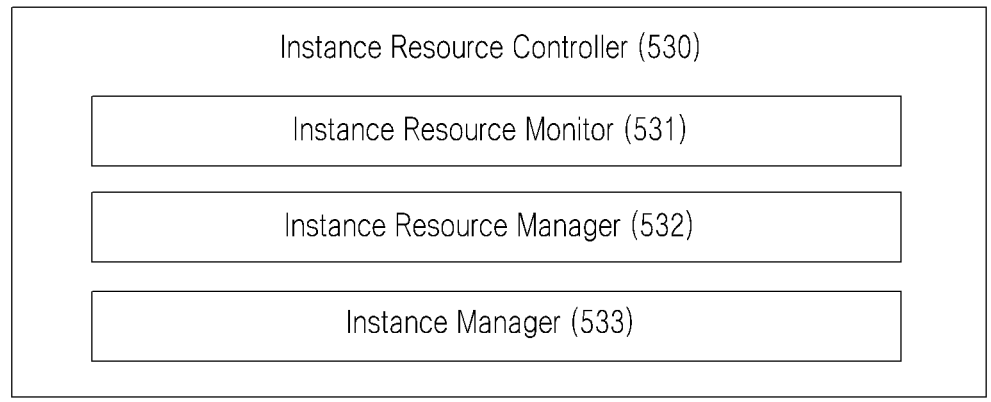
FIG. 9 illustrates an example of an instance resource controller according to an embodiment of the present invention.

FIG. 9 illustrates an example of an instance resource controller 530 according to an embodiment of the present invention.

The instance resource controller 530 may provide a function of managing available instance resources associated with a sensing and controlling device connected to an individual instance hosting service and interactive external services.

The instance resource controller 530 may provide related information in a situation such as an instance movement between instance hosting services and verifying operation instance information about an instance hosting device from an external service, and may also provide a function of coping with error situations by monitoring an individual resource.

Referring to FIG. 9, the instance resource controller 530 may include an instance resource monitor 531, an instance resource manager 532, and an instance manager 533.

The instance resource monitor 531 may provide a function of detecting an abnormal or modified situation of a corresponding sensor and device by continuously monitoring instance resource information, and enabling a related service to be continued using a similar device or other proximate devices.

The instance resource manager 532 may provide a function of managing instance information registered to an instance hosting device, and may update information of a device received from another instance hosting device and space related information to a resource status database.

Here, resource status data may include device information of a device connected to an instance hosting service, such as data unit information of a feeder value generated from an IoT application, spatial information of the instance hosting device that is a service function provided from an instance hosting platform, and the like.

The instance manager 533 may provide a function of calling a corresponding service when providing a service for controlling a space and a device on an instance hosting platform.

Figure 10:
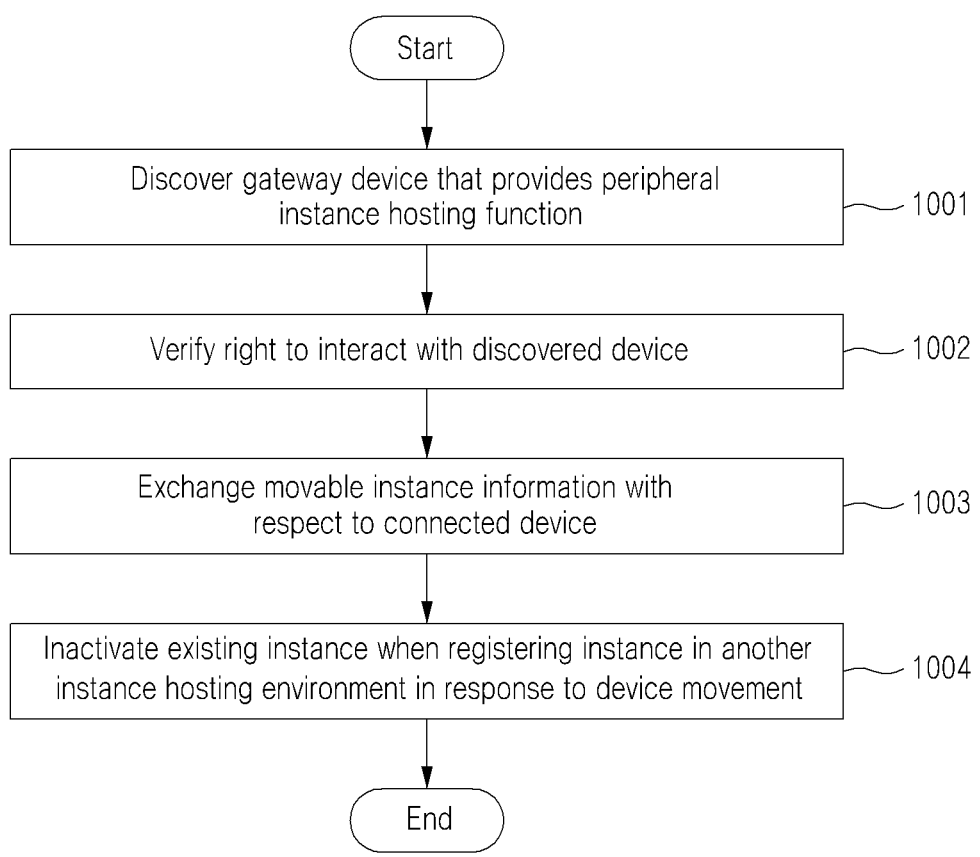
FIGS. 10 through 12 are flowcharts illustrating a method of re-directing an instance hosting service of a virtual object according to an embodiment of the present invention.

FIG. 10 is a flowchart illustrating a process of exchanging instance information between hosting services according to an embodiment of the present invention. Operations included in the instance information exchanging process according to the embodiment may be performed by the aforementioned hosting service re-directing system 500.

In operation 1001, the hosting service re-directing system 500 may discover a gateway device that provides a peripheral instance hosting function. The peripheral device discovery function may be provided to fit for a function of a network interface supported by the instance manager 533. In this instance, a method of verifying a neighbor device may employ methods such as wireless fidelity (Wi-Fi) interface, broadcasting for device discovery in the same wired network environment, and a device discovery method of a digital living network alliance (DLNA).

In operation 1002, the hosting service re-directing system 500 may verify a right to interact with the discovered device. Here, the right to interact with the discovered device may be verified based on authentication information designated by the same service provider, and may be verified based on OAuth.

In operation 1003, the hosting service re-directing system 500 may exchange movable instance information with respect to a connected device. An instance information exchanging process may be performed with respect to an instance having activated a corresponding function among instances that are currently registered and in operation, and may be allowed when information of a registrant and information of a manager of the instance manager 533 match. Also, mutual update may be performed by periodically exchanging corresponding information in addition to initial information exchange.

In operation 1004, the hosting service re-directing system 500 may inactivate an existing instance when registering an instance in another instance hosting environment in response to a device movement. That is, when registering an instance in another instance hosting environment in response to a device movement, a corresponding system may manage corresponding information in an instance pool by a storage point in time and may store the corresponding information on a disc in an existing instance hosting environment, thereby reducing a memory use. Here, related device data log information may also be managed on a system by a predetermined point in time.

Figure 11:
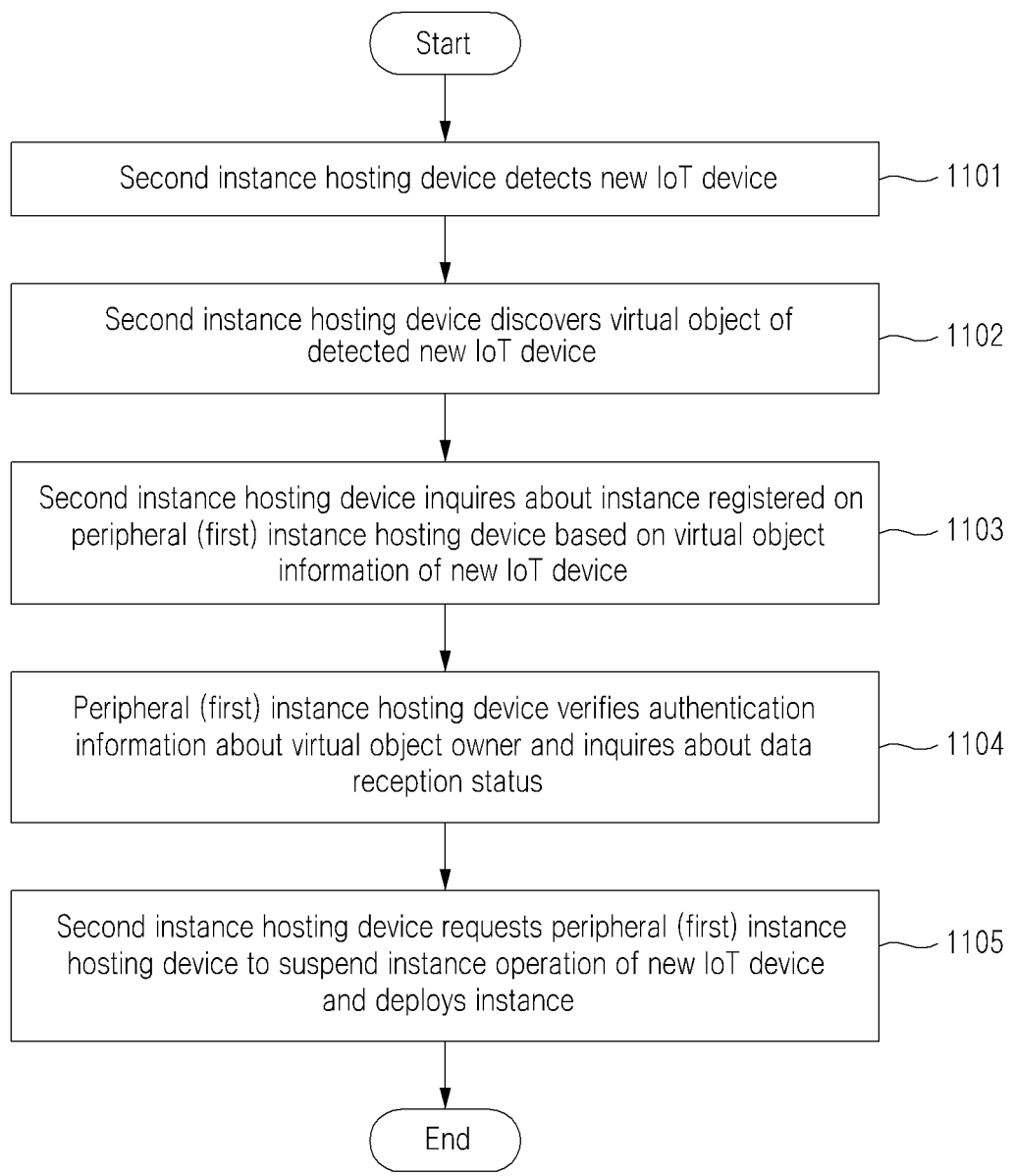

A detailed process of the instance information exchanging process is illustrated in FIG. 11. FIG. 11 is a flowchart illustrating a process of exchanging instance information between instance managers or hosting services.

In operation 1101, a second instance hosting device may detect a new IoT device. In this instance, the second instance hosting device corresponds to a service platform to which an IoT device is to physically move. Since the IoT device located on a boundary is present in a network interference section in an IoT gateway environment, detection of the new IoT device may frequently occur in the second instance hosting device. Accordingly, devices that are simultaneously detected in a plurality of instance hosting devices are not regarded to have moved.

In operation 1102, the second instance hosting device may discover a virtual object of the new IoT device detected in operation 1101.

In operation 1103, the second instance hosting device may inquire about an instance registered on a peripheral instance hosting device, for example, a first instance hosting device based on virtual object information of the new IoT device.

In operation 1104, the peripheral instance hosting device, for example, the first instance hosting device may verify authentication information about a virtual object owner and may inquire about a data reception status. When owner information, for example, deployer information, of the virtual object matches in a peripheral instance hosting environment and an instance call is absent, the corresponding IoT device may be determined to have moved. In this instance, in the case of the virtual object having a control interface, whether the IoT device has moved may be accurately determined by transmitting a message to verify whether the corresponding IoT device has moved.

In operation 1105, the second instance hosting device may request the peripheral instance hosting device, for example, the first instance hosting device to suspend an instance operation of the new IoT device. In this instance, the second instance hosting device may deploy the instance with respect to the new IoT device.

Figure 12:
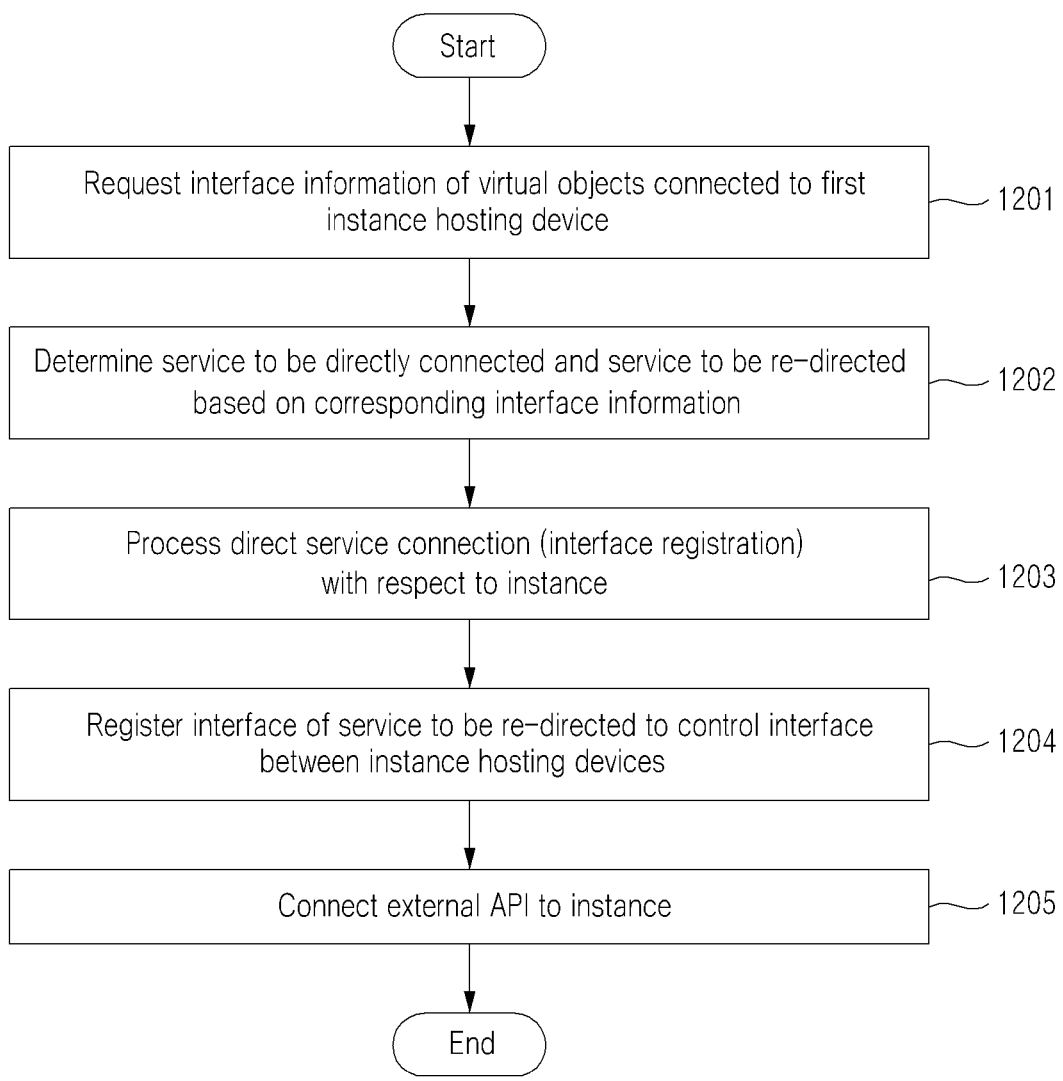

FIG. 12 is a flowchart illustrating a process of moving mash-up and external API connection information according to an embodiment of the present invention.

In operation 1201, a second instance hosting device may request interface information of virtual objects connected to a first instance hosting device. Here, the second instance hosting device may request the first or existing instance hosting device for related interface information in order to use mash-ups or an external API of an instance connected to the existing device.

In operation 1202, the second instance hosting device may determine a service to be directly connected and a service to be re-directed based on the corresponding interface information. The second instance hosting device may collect internal interface and external open API connection information from the corresponding interface information and in the case of internal interface information, may connect a direct service in operation 1203.

In operation 1203, the second instance hosting device may process a direct service connection, for example, an interface registration with respect to the instance.

In operation 1204, the second instance hosting device may register an interface of a service to be re-directed to a control interface between instance hosting devices. Here, the interface of the service to be redirected may be connected to the control interface between the instance hosting devices by requesting the control interface between the instance hosting devices for re-direction information of the corresponding interface.

In operation 1205, the second instance hosting device may connect the external API to the instance. Here, an instance hosting service of the new IoT device may be re-directed by connecting an interface with respect to re-direction information registered on the second instance hosting device.

Figure 13:
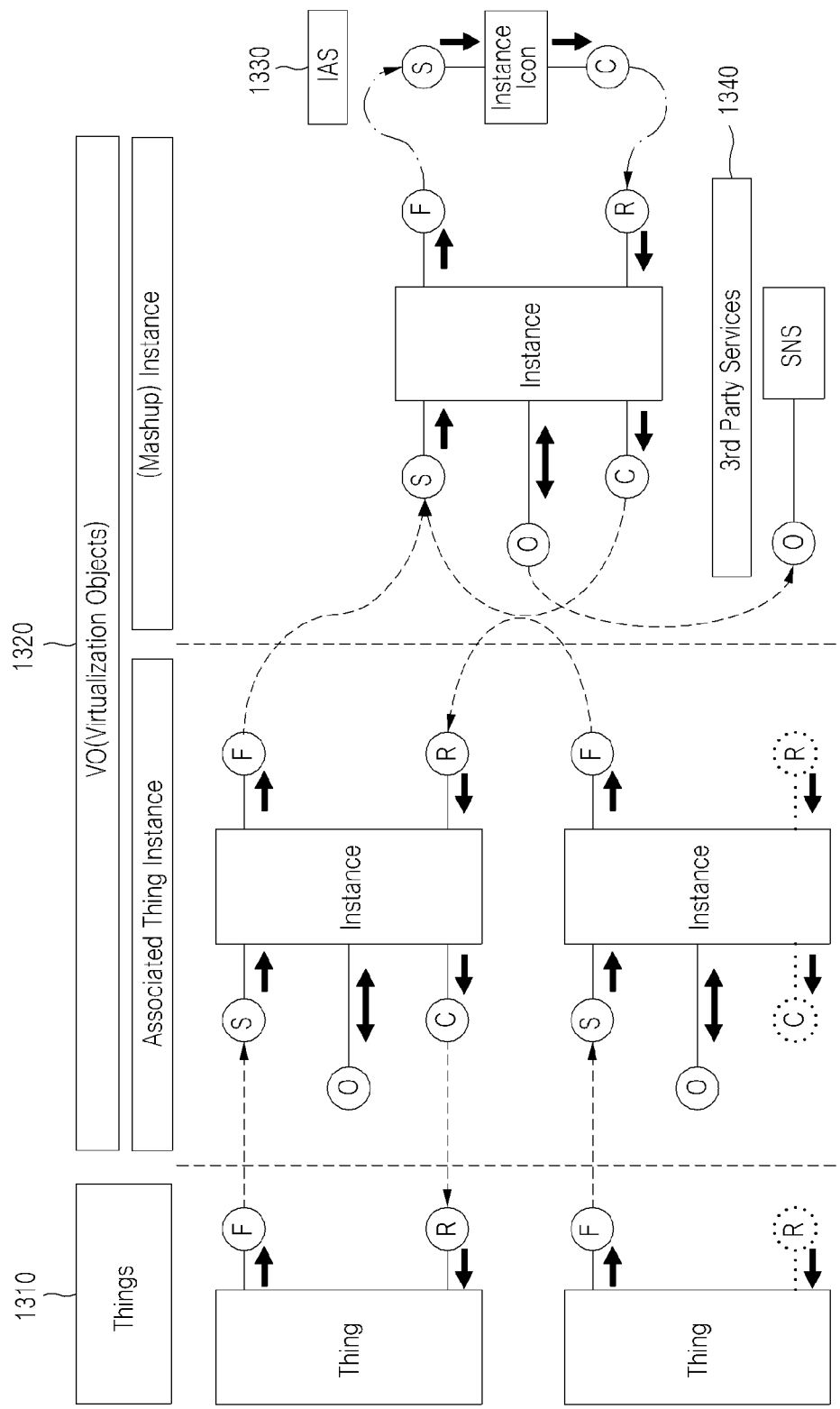
FIG. 13 is a diagram to describe the concept about interfaces of an instance according to an embodiment of the present invention.

FIG. 13 is a diagram to describe the concept about interfaces of an instance according to an embodiment of the present invention. In virtual objects (VO) 1320 of things 1310, a basic interface is required for a connection between a virtual object and a thing and a connection between a virtual object and another virtual object. In the present embodiment, examples of providing a total of five interface functions for an instance in order to effectively and explicitly use an interface are described.

Individual interface Information may be used by explicitly describing the individual interface information in an instance profile for each instance. An instance manager includable in the instance hosting gateway 330 of FIG. 3 may provide a related function based on information of a corresponding instance. Here, FIG. 13 illustrates an instance associated with each of the things 1310 and a mash-up instance for interaction between instances. The mash-up instance may enable an interaction between an instance application server (IAS) 1330 and a $3^{rd}$ party service 1340.

The instance application server 1330 may be in charge of a web application server function of the instance hosting gateway 330. Here, functions provided through the IAS 1330 may be provided using a web interface. The $3^{rd}$ party service 1340 may indicate a variety of external services such as a social network service (SNS) associated with a user.

Figure 14:
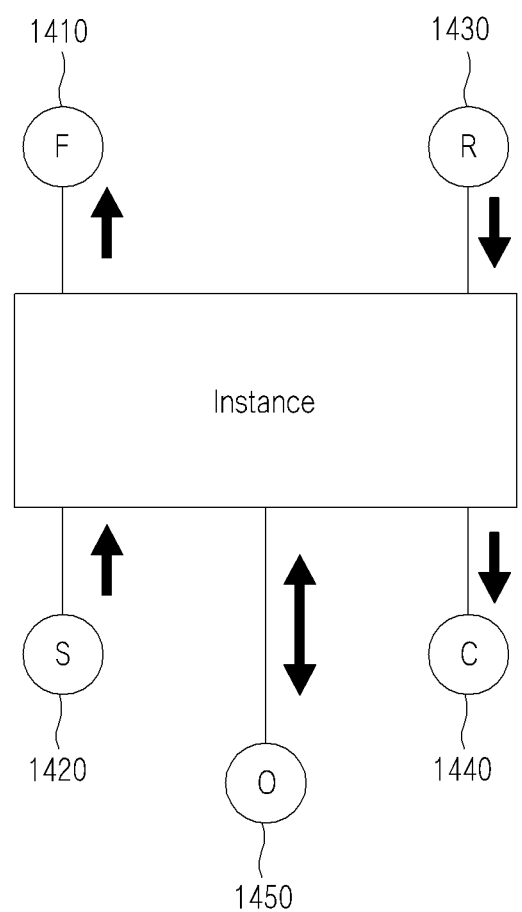
FIG. 14 is a diagram to describe a function with respect to interfaces of an instance according to an embodiment of the present invention.

FIG. 14 is a diagram to describe a function with respect to interfaces of an instance according to an embodiment of the present invention. Instances corresponding to the virtual objects 1320 of FIG. 130 may transmit and receive data (1) between a thing and an instance, (2) between an instance and another instance, (3) between an external service, for example, the $3^{rd}$ party service 1340 and an instance, and (4) between an instance hosting (IH) application function, for example, an instance icon of FIG. 13 and an instance, using five interfaces provided from the instance manager.

An F 1410 denotes a feeder and may include an interface for exposing information that an instance is to provide to another instance or an external service. Here, the F 1410 may serve to store feeding information in a message queue of the instance, instead of directly transferring a message, and may be used in the following cases (1) through (3):

(1) Reading a message received from a device or a thing, and transferring the message to another service or another instance;
 (2) Exposing a predetermined status value within an instance or exposing a value to be transferred to an external service, for example, the $3^{rd}$ party service 1340; and
 (3) Setting a value to be exposed to a user as a representative value through an instance icon, for example, an instance icon of the instance application server 1330, on an instance list among status values of an instance.

An S 1420 denotes a subscriber and may include an interface for receiving information from a feeder of a thing or another interface, and may be used in the following cases (4) and (5):

(4) Being used to receive information from a device or a thing (in this case, information about a physical interface of a thing that a network adaptor included in the instance hosting gateway 330 is to listen to may be described in an associatedThingInformation element); and (5) Subscribing to information about a feeder of another instance (in the case of using a value to be exposed using an interface of the feeder of the other interface)—in this case, it is possible to subscribe to information through an interface fit for a condition defined in a filter.

An R 1430 denotes a receiver and may include an interface through which an instance receives a message from a controller of another instance, and may be used in the following cases (6) through (8):

(6) Receiving information from another instance (receiving information from a controller interface of the other instance);

(7) Receiving a representative control value (in the case of setting a representative attribute value on a feeder) of an instance icon (in the case of processing a direct control of a user); and (8) Receiving a message from an external service (for example, the 3$^{rd}$ party service 1340) (for example, in the case of receiving user status information of a calendar service).

A C 1440 denotes a controller and may include an interface through which an instance transfers information from an outside, and may be used in the following cases (9) and (10):

(9) Transferring a message, for example, a control message to a device or a thing (in the case of transferring a message to a device or a thing in which an associatedThingInformation element is set); and

(10) Transferring a message to another instance (in the case of transferring data using a triggering method instead of inputting data in a message queue of a receiver interface of the other instance).

An O 1450 denotes an authentication (OAuth) and may include an interface through which an instance interacts with a 3$^{rd}$ party service and may be used in the following cases (11) and (12):

(11) Transferring a message to a 3$^{rd}$ party service (after OAuth is completed); and

(12) Inquiring a 3$^{rd}$ party service about a message.

Here, the aforementioned cases (8) and (12) correspond to a case of receiving a message from an external service. Depending on embodiments, a message may be received from the external service through a receiver or through the O 1450.

Hereinafter, interfaces included in an instance will be further described.

1. As described above, a subscriber may be an interface through which an instance is to receive and subscribe to a message from a thing or a feeder interface of another instance. When receiving a message from a thing, the corresponding subscriber needs to describe, in an 'associatedThingInformation' element, information of a physical interface required to receive the message. Here, the required information may include information used for adaptation of a physical interface of a basic device. Further, when receiving a message from another instance, the corresponding subscriber needs to describe, in a filter element, information about a feeder interface of the other instance to subscribe to. Information about the feeder interface may be described in the filter element by inputting information of an instance to subscribe to during a process of registering the corresponding instance. Here, the corresponding instance may be registered using an instance wizard. In a case in which a trigger attribute is set as "true", once a value of a corresponding feeder is generated, an instance manager may immediately call a subscriber instance that subscribes to the same. A corresponding operation may be performed regardless of an 'InstanceRunningPeriod' value.

Attributes of the subscriber may be represented as an example of the following Table 3.

TABLE 3

<xs:element name="subscriber"> <xs:complexType>
<!--used as an identifier for identifying an interface (I/F) for
each instance. The number of available digits is maximum three.-->
<xs:attribute name="id" type="xs:unsignedShort" />
<!-- NAME is available as information for easily identifying
an instance and is available as information to be provided to a user in
order to identify an interface (I/F) of a corresponding instance at the
event of a connection between interfaces.-->
<xs:attribute name="name" type="xs:string" />
<!-- set based on absence/presence of a reaction immediately
after a corresponding value is generated when subscribing to another
instance. An instance manager monitors whether a triggering of a feeder
list is set and immediately transfers data. -->
<xs:attribute name="trigger" type="xs:boolean" />
</xs:complexType> </xs:element>

Also, attributes of a filter within the subscriber may be expressed as an example of the following Table 4.

TABLE 4

<xs:element name="filter"><xs:complexType>
<!-- possible to subscribe to only an interface fit for a
condition defined in a filter in the case of subscribing to a
feeder of another instance. -->
<xs:attribute name="instanceId" type="xs:string"/>
<!-- input an ID value (unique value) of an instance to
subscribe to. -->
<xs:attribute name="feederId" type="xs:unsignedShort"/>
<!-- input a unique ID of a feeder within an instance to
subscribe to. -->
<xs:attribute name="minVersion" type="xs:string"/>
<!-- input a minimum value of a version supported by an
instance to subscribe to. -->
<xs:attribute name="maxVersion" type="xs:string"/>
<!-- input a maximum value of a version supported by an
instance to subscribe to. -->
</xs:complexType></xs:element>
</xs:sequence>

2. A feeder refers to an interface through which an instance is to expose information to another instance. Based on a setting of an instance to subscribe to, a value may be transferred immediately or may be transferred as an input value of another instance in response to an operation of the other instance. In this instance, a message queue may be generated on an instance manager for each individual feeder ID, and data or a message may be stored in the message queue and then be read through a subscriber interface.

With regard to a message transfer method of a feeder, a method of reading a message from the feeder may be classified into a method based on whether a trigger is set in a subscriber interface and a method of transferring a value as an input value in response to an execution of an instance to subscribe to.

A subscriber interface having set a trigger with respect to a corresponding feeder may be called in response to registering a value of a feeder that the subscriber interface is subscribing to. Otherwise, in response to an execution of another instance subscribing to a corresponding feeder, an instance manager may read data and transfer the data as an input value. In this instance, although the instance manager has read a value of the corresponding feeder, data is not immediately erased from a message queue. A size of the corresponding message queue may be a predetermined number of cases, for example, 100 cases for each interface. A corresponding value may remain although the corresponding instance is abnormally terminated.

The feeder may use attributes expressed as the following Table 5. In the case of using 'representative' indicating a representative value (true), when a unit is designated, units such as temperature and Kcal, which are interacting with the corresponding data, may be indicated on a list page of the instance manager.

TABLE 5

<xs:attribute name="id" type="xs:unsignedShort" />
<!-- used as an identifier for identifying an interface (I/F) for each instance. The number of available digits is maximum three.-->
<xs:attribute name="name" type="xs:string" />
<!-- NAME is available as information for easily identifying an instance and is available as information to be provided to a user in order to identify
an interface (I/F) of a corresponding instance at the event of a connection between interfaces.-->
<xs:attribute name="unit" type="xs:string" />
<!-- used to define a data value transmitted and received through a corresponding interface. -->
<xs:attribute name="representative" type="xs:boolean" />
<!-- in the case of setting a corresponding value as a portion for setting a representative value, the corresponding value is output to an instance icon of an instance list page.-->

Figure 15:
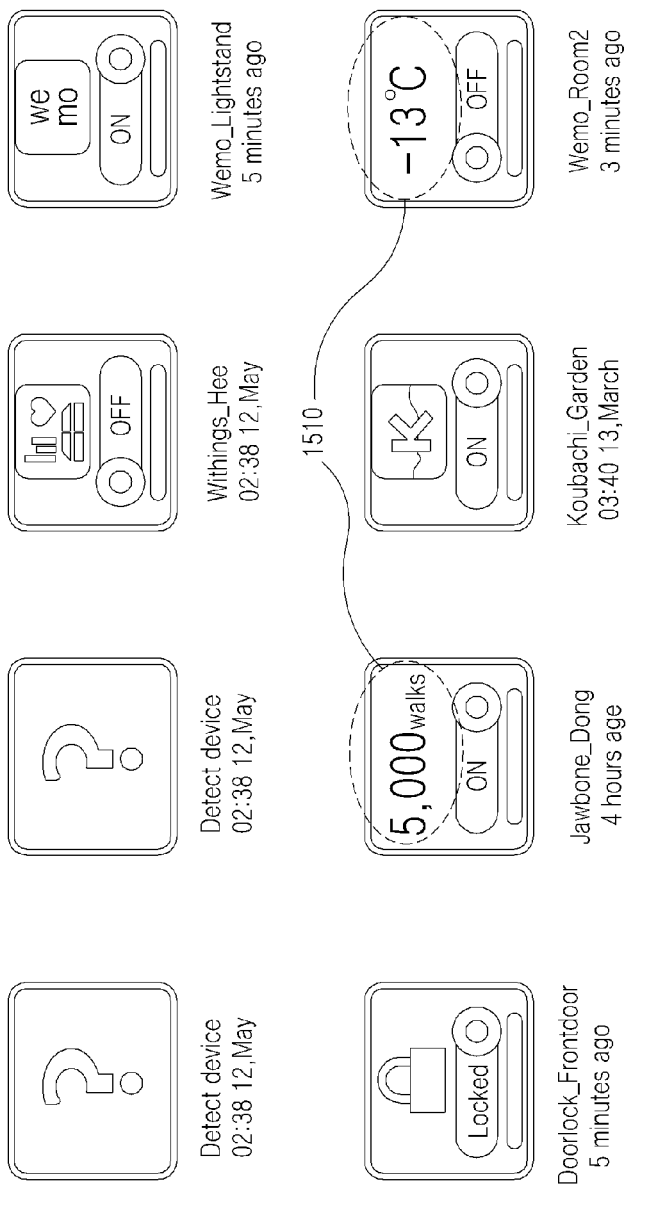

FIG. 15 illustrates an example of an instance list page according to an embodiment of the present invention. FIG. 15 shows a screen 1500 on which a page including a plurality of instance icons is partially displayed. Here, examples in which an attribute 'representative' of a feeder instance is set on an instance icon are expressed using ovals 1510 indicated with dotted lines on the screen 1500.

3. A receiver refers to an interface through which an instance receives a call of a message from another instance, and information may be transferred through a controller interface of the other instance. A message may be directly transferred from the other instance to the instance and a triggering, for example, an execution of the corresponding instance may occur. Such triggering may be performed regardless of a setting of 'runningPeriod' indicating a running period of the instance having received the message.

The receiver may use attributes expressed as the following Table 6. In the case of using 'representative' indicating a representative value (true), when a unit is designated, a button for controlling the corresponding instance may be generated on a list page of the instance manager.

TABLE 6

<xs:attribute name="id" type="xs:unsignedShort" />
<!-- used as an identifier for identifying an interface (I/F) for each instance. The number of available digits is maximum three. -->
<xs:attribute name="name" type="xs:string" />
<!-- NAME is available as information for easily identifying an instance and is available as information to be provided to a user in order to identify
an interface (I/F) of a corresponding instance at the event of a connection between interfaces.-->

TABLE 6-continued

<xs:attribute name="unit" type="xs:string" />
<!-- used to define a data value transmitted and received through a corresponding interface. -->
<xs:attribute name="representative" type="xs:boolean" />
<!-- in the case of setting a corresponding value as a portion for setting a representative value, the corresponding value is output to an instance icon of an instance list page.-->

Referring to FIG. 16, examples in which buttons for controlling an instance corresponding to an instance icon such as "ON", "OFF", and "Locked" are generated on activated icons among icons displayed on a screen 1600 are expressed using ovals 1610 indicated with dotted lines.

4. A controller may include an interface through which an instance transfers a message to another instance, or a device or a thing. The controller may call a corresponding instance using a direct transfer method to transfer a message to another instance. The message may be transferred to the corresponding instance through a receiver interface. For example, a transfer of a message may be triggered regardless of a setting of 'runningPeriod' indicating a running period of the instance having received the message. When transferring a message to a device or a thing, the controller may immediately transfer the message through a network adaptor.

When transferring a message to another instance, information of a receiver interface of the other interface needs to be described in a filter element. Here, information described in the filter element may be expressed as the following Table 7.

TABLE 7

<xs:element name="filter"><xs:complexType>
<!-- When transferring a message to a receiver of another instance, a message transfer is allowed only with respect to an interface fit for a condition defined in a filter. -->
<xs:attribute name="instanceId" type="xs:string"/>
<!-- ID value (unique value) of an instance to transfer a message. -->
<xs:attribute name="receiverId" type="xs:unsignedShort"/>
<!-- ID value (unique value) of a receiver interface within an instance to transfer a message. -->
<xs:attribute name="minVersion" type="xs:string"/>
<!-- input a minimum value of a version supported by an instance to transfer.-->
<xs:attribute name="maxVersion" type="xs:string"/>
<!-- input a maximum value of a version supported by an instance to transfer. -->
</xs:complexType></xs:element>

Also, the controller may have attributes as expressed by the following Table 8.

TABLE 8

<xs:attribute name="id" type="xs:unsignedShort" />
<!-- used as an identifier for identifying an interface (I/F) for each instance. The number of available digits is maximum three.-->
<xs:attribute name="name" type="xs:string" />
<!-- NAME is available as information for easily identifying an instance and is available as information to be provided to a user in order to identify an interface (I/F) of a corresponding instance at the event of a connection between interfaces.-->
</xs:complexType> </xs:element>

5. An authentication interface (hereinafter, 'OAuth') may include an interface used when an instance interacts with an external $3^{rd}$ party service through OAuth-based authentication. To this end, a user needs to initially perform an OAuth account authentication of a target service that the user is to connect to. The OAuth account authentication may be performed separately using an instance wizard or an OAuth menu.

Authentication information of OAuth for interaction may be set or may be cancelled, for each individual instance. For example, a plurality of social network service accounts may be set or cancelled to be different for each instance.

An instance may determine whether a corresponding OAuth interaction is required based on a necessity of OAuth. Corresponding information is indicated using an attribute 'required'. In a case in which the attribute 'required' is set to be 'true', if an OAuth interaction is not normally performed, the corresponding instance may be unable to be in a running status. After registration, the instance may remain in an error status.

The authentication interface, that is, OAuth may have attributes as expressed by the following Table 9.

TABLE 9

```
<xs:element name="oAuth"> <xs:complexType>
<!-- used as an identifier for identifying an interface (I/F) for
each instance. The number of available digits is maximum three. -->
<xs:attribute name="id" type="xs:unsignedShort" />
<!-- input a name of a service to interact with OAuth. For example,
Twitter is input together with 'twitter', Facebook is input together with
'facebook', and Google is input together with 'Google'. -->
<xs:attribute name="serviceName" type="xs:string" />
<!-- describe an explanation informing a user about information
to be used in an OAuth account. For example, describe information about
an access purpose and information to be accessed. -->
<xs:attribute name="description" type="xs:string" />
</xs:complexType> </xs:element>
```

As described above, according to embodiments of the present invention, it is possible to manage heterogeneous devices or various services through interaction or fusion therebetween and to provide an integrated service in an IoT environment, a WoT environment, or a WoO environment. Further, according to embodiments of the present invention, it is possible to provide a mobility to a virtualized IoT device using an instance hosting function, and to provide a permanent service of the virtualized IoT device by maintaining a connection between virtual objects connected in a form of a mash-up or an open API.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described example embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments of the present invention, or vice versa.

Although a few example embodiments of the present invention have been shown and described, the present invention is not limited to the described example embodiments. Instead, it would be appreciated by those skilled in the art that changes may be made to these example embodiments without departing from the principles and spirit of the invention, the scope of which is defined by the claims and their equivalents.

The invention claimed is:

1. A method of re-directing a dynamic instance hosting service in an instance hosting environment, the method comprising:

discovering, by a first instance hosting system within an access point, an Internet of Things (IoT) device using an instance hosting function by detecting that the IoT device is within a predetermined distance of the access point; and exchanging information for a movable predetermined instance registered with respect to the IoT device with a second instance hosting system within another access point;

transmitting, by the first instance hosting system, a message to the IoT device using the instance information registered with respect to the IoT device;

determining, by the first instance hosting system, that the IoT device has moved to the second instance hosting system when a response to the IoT device message is absent and the IoT device is not detected by at least two instance hosting systems simultaneously; and in response to the determination that the IoT device has physically moved, the corresponding instance of the moved IoT device is registered to the other second instance hosting system and in response to the registration of the corresponding instance of the moved IoT device to the second instance hosting system, inactivating, by the first instance hosting system, the corresponding instance of the moved IoT device in the first instance hosting system.

2. The method of claim 1, prior to the exchanging, further comprising:
verifying a right to interact with the IoT device based on an authentication method using an open application programming interface (API) of a service connected to the IoT device.

3. A method of re-directing a dynamic instance hosting service in an instance hosting environment, the method comprising:
detecting, by a first instance hosting system within an access point, a new Internet of Things (IoT) device to use an instance hosting function by detecting that the new IoT device is within a predetermined distance of the access point;
determining, by the first instance hosting system, that a movable instance with respect to the new IoT device is registered to a second instance hosting system;
requesting, by the first instance hosting system, the second instance hosting system to verify whether the new IoT device has moved using information for the movable instance, wherein the second instance hosting system is configured to inquire about the instance registered with respect to the new IoT device based on the information for the movable instance and to determine that the new IoT device has moved when a response to an IoT device message is absent and the new IoT device is not detected by at least two instance hosting systems simultaneously;
in response to receiving an indication from the second instance hosting system that the new IoT device has physically moved, registering, by the first instance hosting system, the instance with respect to the new IoT device, and requesting, by the first instance hosting system, the second instance hosting system to suspend an operation of the instance of the new IoT device in the second instance hosting system; and
deploying the instance with respect to the new IoT device.

4. The method of claim 3, further comprising:
requesting interface information of a virtual object connected to the second instance hosting system; and
connecting a service associated with the instance with respect to the new IoT device, using the interface information.

5. The method of claim 4, wherein the interface information comprises internal interface information of the instance registered with respect to the new IoT device and external open application programming interface (API) connection information, and
the connecting comprises connecting a direct service to the interface using the internal interface information and connecting an external API to the instance using the external open API connection information.

6. An instance hosting system for re-directing a dynamic instance hosting service, the instance hosting system being a first instance hosting system comprising:
an access point; and
a non-transitory computer-readable memory coupled to the access point and storing thereon instructions that are executed by the access point, the instructions including:
a spatial information controller configured to determine whether an instance of an Internet of Things (IoT) device is movable based on spatial information of the IoT device using an instance hosting function; and
an instance resource controller configured to:
exchange information for the movable predetermined instance registered with respect to the IoT device with a second instance hosting system within another access point;
transmit a message to the IoT device using the instance information registered with respect to the IoT device;
determine that the IoT device has moved to the second instance hosting system when a response to the IoT device message is absent and the IoT device is not detected by at least two instance hosting systems simultaneously; and
in response to the determination that the IoT device has physically moved, the corresponding instance of the moved IoT device is registered to the second instance hosting system and in response to the registration of the corresponding instance of the moved IoT device to the second instance hosting system, inactivate the corresponding instance of the IoT device in the first instance hosting system.

7. The instance hosting system of claim 6, further comprising:
an authentication controller configured to collect authentication information of the IoT device,
wherein the authentication controller is configured to verify a right to interact with the IoT device based on an authentication method using an open application programming interface (API) of a service connected to the IoT device.

8. The instance hosting system of claim 6, wherein the instance resource controller is configured to request the second instance hosting system to which an instance is registered with respect to a new Internet of Things (IoT) device to suspend an instance operation of the new IoT device, and to deploy the instance with respect to the new IoT device, in response to a detection of the new IoT device to use the instance hosting function.

9. The instance hosting system of claim 8, wherein the spatial information controller is configured to discover a virtual object with respect to the new IoT device, and to request the second instance hosting system to verify whether the new IoT device has moved, using information associated with the virtual object, and
the second instance hosting system is configured to inquire about the instance registered with respect to the new IoT device based on information associated with the virtual object, and to determine that the new IoT device has moved when a call of the registered instance by the new IoT device is absent.

10. The instance hosting system of claim 8, further comprising:
an exposure controller configured to provide an interaction interface about a service function provided from an instance hosting platform,
wherein the exposure controller is configured to request interface information of the virtual object connected to the second instance hosting system, and to connect a service associated with the instance with respect to the new IoT device, using the interface information, in response to the instance deployment of the instance resource controller.

* * * * *